ADDRESS DEVELOPMENT APPARATUS FOR A DATA PROCESSING SYSTEM

Filed June 27, 1966 Sheet 1 of 2

INVENTORS.
DAVID L. BAHRS
JOHN F. COULEUR
PHILIP F. GUDENSCHWAGER
RICHARD L. RUTH
WILLIAM A. SHELLY

BY
[signature]

ATTORNEY

ADDRESS DEVELOPMENT APPARATUS FOR A DATA PROCESSING SYSTEM

Filed June 27, 1966

United States Patent Office 3,454,934

Patented July 8, 1969

3,454,934

ADDRESS DEVELOPMENT APPARATUS FOR A DATA PROCESSING SYSTEM

David L. Bahrs, Liverpool, N.Y., and John F. Couleur, Phoenix, Philip F. Gudenschwager, Scottsdale, and Richard L. Ruth and William A. Shelly, Phoenix, Ariz., assignors to General Electric Company, a corporation of New York Filed June 27, 1966, Ser. No. 560,717

Int. Cl. G11b *13/00;* G06f *1/00, 7/00*

U.S. Cl. 340—172.5 11 Claims

ABSTRACT OF THE DISCLOSURE

A data processing system including a data processor and a memory unit is shown. The processor includes a means for providing several different types of address modifications.

Figure 1:
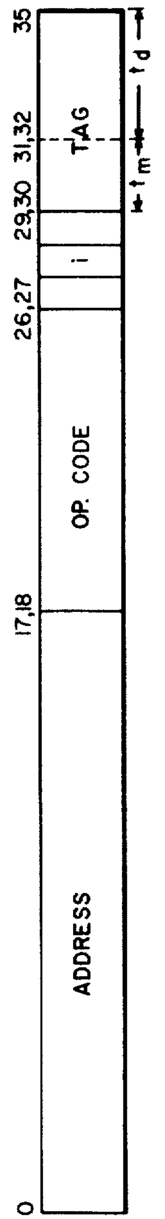

This invention relates generally to data processing systems and, more particularly, to means for providing memory addresses in a data processing system.

In a data processing system which executes a sequence of instruction words called a program to process data, it is often desirable to provide the capability of what is generally referred to as indirect addressing. More correctly, it is desirable to provide for addess modification which includes indirect addressing. In address modification, an instruction word, which normally includes an address portion as well as additional data concerning an operation to be performed, is operatively employed with a second type of information item termed an indirect word. These two words, the instruction word and the indirect word, collectively define the total of an operation to be performed with respect to an information item stored in the memory. This latter information item is normally called on operand.

Address modification permits versatility and flexibility in establishing programs for a data processing system and greatly eases the problems of the programmer. Address modification also facilitates the use of certain fundamental concepts by more than one programmer without the inclusion of a great number of details in each of the programs. Additionally, certain types of address modifications permit the traversal of tables (a series of storage locations) by the execution of a single command without the necessity of programmer supervision of each individual step to thus permit what amounts to an automatic search for a specific detail or information item.

Without address modification it is necessary for the programmer to use what is sometimes termed an impure procedure. In an impure procedure, the programmer must modify each instruction used. This prohibits, in a multiprocessor system, the use of a single instruction by more than one program. Thus, an impure procedure does not represent an efficient method of programming. Additionally, by address modification a particular memory location may be preselected which will serve to point to a particular type of function. With this knowledge the programmer may proceed to write his program knowing that when he needs this particular type of function he need only reference this preselected location.

While address modification is fairly well developed in the art it has suffered from lack of versatility in the number of ways of developing addresses. Accordingly, it is desirable to extend the usefulness of address modification in a data processing system.

It is, therefore, an object of the present invention to provide an improved address modification apparatus in a data processing system.

It is another object of the invention to extend the address modification capability of a data processing system.

It is a still further object to provide a data processing system embodying new and improved means for address development.

Still another object is to provide a data processing system employing address modification apparatus to ensure greater versatility to the program.

It is a still further object of the present invention to provide a data processing system employing address modification apparatus which provides for the indirect retrieval of a first information item specifying a portion of another information item and which further provides for the modification of the contents of the first information item.

The foregoing objects are achieved, in accordance with the illustrated embodiment of the present invention by providing an instruction word which includes an address portion. The address portion of this instruction word is utilized to obtain a second or indirect word which is brought from the memory unit to the data processing unit of the system. The indirect word includes an address portion which specifies the memory location of an information item and a tag portion which defines a particular portion of that information item. Each time the indirect word is brought from memory its tag portion is changed. When the tag portion reaches a prescribed value, the address portion of the indirect word is changed. The indirect word may also include a tally portion which counts the number of times the indirect word is brought from the memory unit.

*Drawings*

Figure 2:
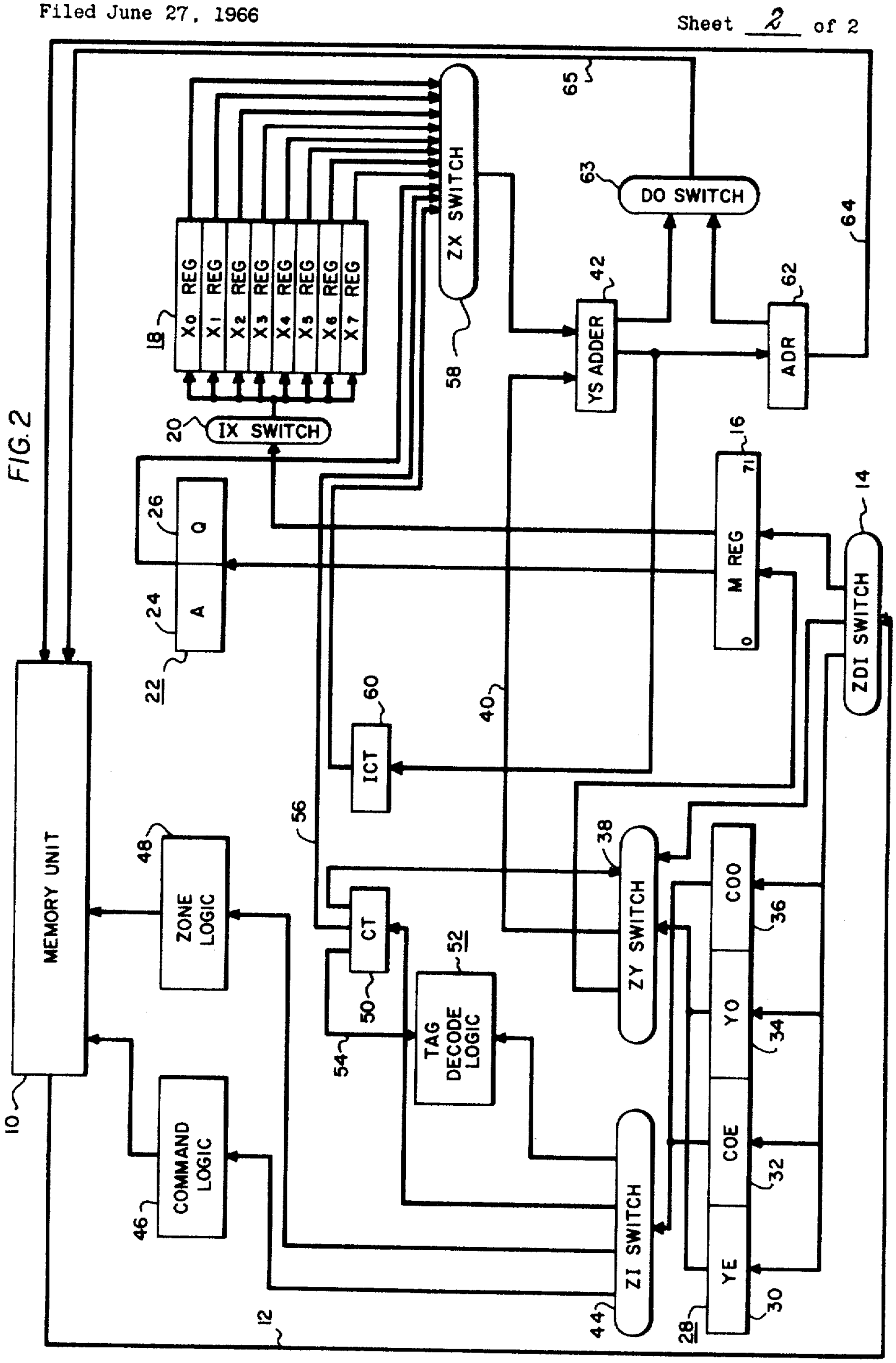

For a better understanding of the invention, reference is made to the accompanying drawings in which:

FIGURE 1 illustrates the format of a typical instruction word used in the present invention; and FIGURE 2 is a major block diagram illustrating the data paths in the system of the present invention.

For a complete description of the system illustrated in FIGURES 1 and 2 and of our invention, reference is made to United States Patent No. 3,425,039, issued to David L. Bahrs et al. on Jan. 28, 1969, and assigned to the assignee of the present invention. More particularly, attention is directed to FIGURES 3 through 20 and to the specification beginning at column 2, line 42, and ending at column 25, line 56, inclusive, of United States Patent No. 3,425,039 which are incorporated herein by reference and made a part hereof as if fully set forth herein.

What is claimed is:

1. In a data processing system, the combination comprising: a memory unit having a plurality of selectively addressable storage locations each containing an information item, certain of said information items each comprising an instruction word containing an address portion and a tag portion, certain other of said information items each comprising an indirect word containing an address portion and a tag portion specifying a part of an information item; means for retrieving an instruction word from said memory unit; means responsive to the address and tag portions of said instruction word for retrieving an indirect word from said memory unit; means for varying the tag portion of said indirect word to provide a modified indirect word tag portion; means responsive to a predetermined value of said modified tag portion to vary the address portion of said indirect word to provide a modified address portion, said modified tag and address portions comprising a modified indirect word; means for storing the modified indirect word into said memory unit; and means responsive to said address portion of said indirect word to provide a subsequent accessing of said memory unit at the location specified thereby to thereby enable the performance of an operation with respect to that portion of an information item specified by the tag portion of said indirect word.

2. In a data processing system, the combination comprising: a memory unit having a plurality of selectively addressable storage locations each containing an information item, certain of said information items each comprising an instruction word containing an address portion and a tag portion, certain other of said information items each comprising an indirect word containing an address portion, a tally portion and a tag portion specifying a part of an information item; means for retrieving an instruction word from said memory unit; means responsive to the address and tag portion of said instruction word for retrieving an indirect word from said memory unit; means to vary said tally portion a prescribed amount to provide a modified tally portion; means responsive to a predetermined value of said tally portion for providing an output signal; means for varying the tag portion of said indirect word to provide a modified indirect word tag portion; means responsive to a predetermined value of said modified tag portion to vary the address portion of said indirect word to provide a modified address portion; said modified address, tally and tag portions collectively comprising a modified indirect word; means for storing said modified indirect word into the location of the memory unit specified by the address portion of said instruction word; and means responsive to said address portion of said indirect word to provide a subsequent accessing of said memory unit at the location specified thereby to thereby permit the performance of an operation with respect to that portion of an information item specified by the tag portion of said indirect word.

3. In a data processing system, the combination comprising: a memory unit having a plurality of selectively addressable storage locations each containing an information item, certain of said information items each comprising an instruction word containing an address portion, an operation code portion and a tag portion, certain other of said information items each comprising an indirect word containing an address portion, a tally portion and a tag portion specifying a particular part of an information item; means for retrieving an instruction word from said memory unit; means responsive to the address and tag portions of said instruction word for retrieving an indirect word from said memory unit; means operable to decrement said tally portion and to increment said tag portion of said indirect word; means for providing an output signal in response to a predetermined value of said tally portion; means responsive to said incremented tag portion of said indirect word for increasing the address portion of said indirect word by one upon the reaching of a prescribed value of said tag portion of said indirect word; means for storing the modified tally, tag and address portions of said indirect word into the location of the memory unit from whence the indirect word was taken; and means responsive to said address portion of said indirect word to provide a subsequent accessing of said memory unit at the location specified thereby to thereby enable the performance of an operation with respect to that portion of an information item specified by the tag portion of said indirect word.

4. In a data processing system, the combination comprising: a memory unit having a plurality of selectively addressable storage locations each containing an information item, certain of said information items comprising an instruction word containing an address portion defining a particular one of said selectable storage locations, an operation code portion defining an operation to be performed with respect to an information item, and a tag portion defining a modification function, certain other of said information items comprising an indirect word containing an address portion defining a particular storage location, a tally portion containing a prescribable numeric value, and a tag portion including parts defining a byte size and a byte position count, said latter tag portion defining a specific part of an information item; means for bringing an instruction word from said memory unit; means responsive to the address and tag portions of said instruction word for bringing an indirect word from said memory unit; means for varying the value of said tally portion by a prescribed amount each time said indirect word is brought from said memory unit; means responsive to a specified value of said tally portion for providing an indication of said specified value; additional means for varying the byte position count part of said tag portion of said indirect word; means to vary the value of said address portion of said indirect word in response to the reaching of a prescribed value of said byte portion count; means to store a modified indirect word, comprising the varied tally, tag and address portions of said indirect word, into said memory unit at the location specified by the address portion of said instruction word; and means responsive to said instruction and indirect words to provide a subsequent accessing of said memory unit at the storage location specified by the address portion of said indirect word to thereby enable the performance of the operation on that portion of an information item specified by the tag portion of said original indirect word.

5. In a data processing system, the combination comprising: a memory unit having a plurality of selectively addressable storage locations each containing an information item, certain of said information items comprising an instruction word containing an address portion defining a particular one of said selectable storage locations, an operation code portion defining an operation to be performed with respect to an information item, and a tag portion defining a modification function, certain other of said information items comprising an indirect word containing an address portion defining a particular storage location, a tally portion representing a prescribable numeric value and a tag portion including parts defining a character size and a character position count within an information item; means for retrieving an instruction word from said memory unit; means responsive to the address and tag portions of said instruction word for retrieving an indirect word from said memory unit; means for varying the value of said tally portion by a prescribed amount; means responsive to a specified value of said tally portion for providing an indication of said specified value; additional means to vary the character position count part of said indirect word tag portion; means responsive to a prescribed value of said character portion count to vary said address portion of said indirect word; means to store a modified indirect word, comprising the varied tally, tag and address portions of said indirect word, into said memory unit at the location specified by the address portion of said intruction word; and means responsive to said instruction and indirect words to provide a subsequent accessing of said memory unit at the storage location specified by the address portion of said indirect word to thereby permit the performance of the operation specified by the operation code portion of said instruction word on that portion of an information item specified by the tag portion of said indirect word.

6. In a data processing system, the combination comprising: a memory unit having a plurality of selectively addressable storage locations each containing an information item, certain of said information items comprising an instruction word containing an address portion defining a particular one of said selectable storage locations, an operation code portion defining an operation to be performed with respect to an information item, and a tag portion defining a modification function, certain other of said information items comprising an indirect word containing an address portion defining a particular storage location, a tally portion containing a prescribable numeric value and a tag portion defining a character size and position within an information item; means for bringing an instruction word from said memory unit; means responsive to the address and tag portions of said instruction word for bringing an indirect word from said memory unit; means to decrement the value of said tally portion by one each time said indirect word is brought from said memory unit; means responsive to a specified value of said tally portion for providing an indication of said specified value; additional means to increment the value of said tag portion each time said indirect word is brought from said memory unit; means responsive to the value of said tag portion to increment the value of said address portion upon the reaching of a prescribed value of said tag portion; means to store a modified indirect word, comprising the decremented tally portion and the incremented tag and address portions into the storage location of said memory unit specified by the address portion of said instruction word; and means responsive to said instruction word and said indirect word to provide a subsequent accessing of said memory unit at the storage location specified by the address portion of said indirect word to thereby permit the performance of the operation specified by the operation code portion of said instruction word on that portion of an information item specified by the tag portion of said indirect word.

7. In a data processing system, the combination comprising: a data processing unit; a memory unit having a plurality of addressable storage locations each containing an information item, certain of said information items comprising instruction words, each of said instruction words containing an address portion specifying a particular one of said storage locations, an operation code portion defining an operation to be performed upon an information item, and a tag portion defining an address modification type, certain other said information items comprising indirect words, each of said indirect words containing an address portion specifying a particular one of said storage locations, a tally portion having a prescribable numeric value and a tag portion having a byte size portion and a byte position portion, said tag portion defining a byte size and byte position within an information item; means for bringing an instruction word to said data processing unit from said memory unit; means responsive to the address and tag portions of said instruction word for bringing an indirect word specified by the address portion of said instruction word from said memory unit to said data processing unit; said data processing unit including modifying means for varying the value of said tally portion by a preselected amount, indicator means responsive to a prescribed value of said tally portion for providing an output signal, and means for varying the value of said byte position portion; means responsive to a prescribed value of said byte position portion of said tag portion of said indirect word for varying the value of said address portion of said indirect word; means for storing the tally, tag and address portions of said indirect word, in their modified forms, into the memory unit location specified by the address portion of said instruction word; and means responsive to the unmodified address portion of said indirect word to provide a subsequent accessing of said memory unit at the location specified thereby, said subsequent accessing involving that portion of an information item specified by the unmodified tag portion of said indirect word, said portion being acted upon in accordance with the operation code portion of said instruction word.

8. In a data processing system, the combination comprising: a data processing unit; a memory unit having a plurality of addressable storage locations each containing an information item, certain of said information items comprising instruction words, each of said instruction words containing an address portion specifying a particular one of said storage locations, an operation code portion defining an operation to be performed upon an information item, and a tag portion defining an address modification type, certain other said information items comprising indirect words, each of said indirect words containing an address portion specifying a particular one of said storage locations, a tally portion having a prescribable numeric value and a tag portion having a byte size portion and a byte position portion, said tag portion defining a byte size and byte position within an information item; means for bringing an instruction word to said data processing unit from said memory unit; means responsive to the address and tag portions of said instruction word for bringing an indirect word specified by the address portion of said instruction word from said memory unit to said data processing unit; said data processing unit including modifying means for decrementing the value of said tally portion to provide a modified tally portion, indicator means responsive to a prescribed value of said tally portion for providing an output signal, and means for incrementing the value of said byte position portion to provide a modified tag portion; means responsive to a prescribed value of said byte position portion of said tag portion of said indirect word for increasing the value of said address portion of said indirect word to provide a modified address portion; said modified tally, tag and address portions comprising a modified indirect word; means for storing said modified indirect word into the memory unit location specified by the address portion of said instruction word; and means responsive to the unmodified address portion of said indirect word to provide a subsequent accessing of said memory unit at the location specified thereby, said subsequent accessing involving that portion of an information item specified by the unmodified tag portion of said indirect word, said portion being acted upon in accordance with the operation code portion of said instruction word.

9. In a data processing system, the combination comprising: a data processing unit; a memory unit having a plurality of addressable storage locations each containing an information item, certain of said information items comprising instruction words, each of said instruction words containing an address portion specifying a particular one of said storage locations, an operation code portion defining an operation to be performed upon an information item, and a tag portion defining an address modification type, certain other said information items comprising indirect words, each of said indirect words containing an address portion specifying a particular one of said storage locations, a tally portion having a prescribable numeric value and a tag portion having a byte size portion and a byte position portion, said tag portion defining a byte size and byte position within an information item; means for bringing an instruction word to said data processing unit from said memory unit; means responsive to the address and tag portions of said instruction word for bringing an indirect word specified by the address portion of said instruction word from said memory unit to said data processing unit; said data processing unit including modifying means for decrementing the value of said tally portion by one to provide a modified tally portion, indicator means responsive to a prescribed value of said tally portion for providing an output signal, and means for incrementing the value of said byte position portion by one to provide a modified tag portion; means responsive to a prescribed value of said byte position portion of said tag portion of said indirect word for increasing the value of said address portion of said indirect word by one to provide a modified address portion, said modified tally, tag and address portions comprising a modified indirect word; means for storing said modified indirect word into the memory unit location specified by the address portion of said instruction word; and means responsive to the unmodified address portion of said indirect word to provide a subsequent accessing of said memory unit at the location specified thereby, said subsequent accessing involving that portion of an information item specified by the unmodified tag portion of said indirect word, said portion being acted upon in accordance with the operation code portion of said instruction word.

10. In a data processing system of the type comprising a memory unit having a plurality of selectively addressable storage locations each containing an information item, a data processing unit for acting upon selected ones of said information items, and means interconnecting said memory and data processing units whereby selected ones of said information items can be transferred therebetween, the improvement comprising: certain of said information items consisting of an instruction word containing an address portion defining a particular one of said selectable storage locations, an operation code portion defining an operation to be performed with respect to an information item, and a tag portion defining a modification function, certain other of said information items consisting of an indirect word containing an address portion defining a particular storage location, a tally portion representing a prescribable numeric value and a tag portion including parts defining a character size and a character position count within an information item; means for retrieving an instruction word from said memory unit; means responsive to the address and tag portions of said instruction word for retrieving an indirect word from said memory unit; means for varying the value of said tally portion by a prescribed amount; means responsive to a specified value of said tally portion for providing an indication of said specified value; additional means to vary the character position count part of said indirect word tag portion; means responsive to a prescribed value of said character portion count to vary the value of said address portion; means to store a modified indirect word, comprising the varied tally, tag and address portions of said indirect word, into the storage location specified by the address portion of said instruction word; and means responsive to said instruction and indirect words to provide a subsequent accessing of said memory unit at the storage location specified by the address portion of said indirect word to thereby permit the performance of the operation specified by the operation code portion of said instruction word on that portion of an information item specified by the tag portion of said indirect word.

11. In a data processing system of the type comprising a memory unit having a plurality of addressable storage locations each containing an information item, a data processing unit for acting upon selected ones of said information items, and means interconnecting said memory and data processing units whereby selected ones of said information items can be transferred therebetween, the improvement comprising: certain of said information items comprising instruction words, each of said instruction words containing an address portion specifying a particular one of said storage locations, an operation code portion defining an operation to be performed upon an information item, and a tag portion defining an address modification type, certain other said information items comprising indirect words, each of said indirect words containing an address portion specifying a particular one of said storage locations, a tally portion having a prescribable numeric value and a tag portion having a byte size portion and a byte position portion, said tag portion defining a byte size and byte position within an information item; means for bringing an instruction word to said data processing unit from said memory unit; means responsive to the address and tag portions of said instruction word for bringing an indirect word specified by the address portion of said instruction word from said memory unit to said data processing unit; said data processing unit including modifying means for varying the value of said tally portion by a prescribed amount, indicator means responsive to a prescribed value of said tally portion for providing an output signal, and means for varying the value of said byte position portion; means responsive to a prescribed value of said byte position portion of said tag portion of said indirect word for varying the value of said address portion of said indirect word; means for storing the tally, tag and address portions of said indirect word, in their modified forms, into the memory unit location specified by the address portion of said instruction word; and means responsive to the unmodified address portion of said indirect word to provide a subsequent accessing of said memory unit at the location specified thereby, said subsequent accessing involving that portion of an information item specified by the unmodified tag portion of said indirect word, said portion being acted upon in accordance with the operation code portion of said instruction word.

References Cited

IBM System/360, Principles of Operation, IBM Systems Reference Library, Form A22–6821–1, File No. 5.

PAUL J. HENON, *Primary Examiner.*

I. S. KAVRUKOV, *Assistant Examiner.*